Nov. 24, 1970  L. G. MILLER  3,543,113

LOAD WEIGHT CIRCUIT FOR TRACTION MOTOR CONTROL SYSTEMS

Filed March 6, 1968

INVENTOR
Lalan G. Miller
BY
ATTORNEY

United States Patent Office

3,543,113
Patented Nov. 24, 1970

3,543,113
LOAD WEIGHT CIRCUIT FOR TRACTION MOTOR CONTROL SYSTEMS
Lalan G. Miller, Forest Hills, Pa., assignor to Westinghouse Electric Corporation, Pittsburgh, Pa., a corporation of Pennsylvania
Filed Mar. 6, 1968, Ser. No. 711,002
Int. Cl. H02p 5/20
U.S. Cl. 318—142
8 Claims

ABSTRACT OF THE DISCLOSURE

A load weight circuit for traction motor control systems for adjusting the tractive effort or braking effort to the weight of the car. The circuit provides a load weight bias voltage proportional to both the weight of the car and an incoming control signal and adds the bias voltage to the control signal to provide a modified control signal to the motor control system.

---

Figure 1:
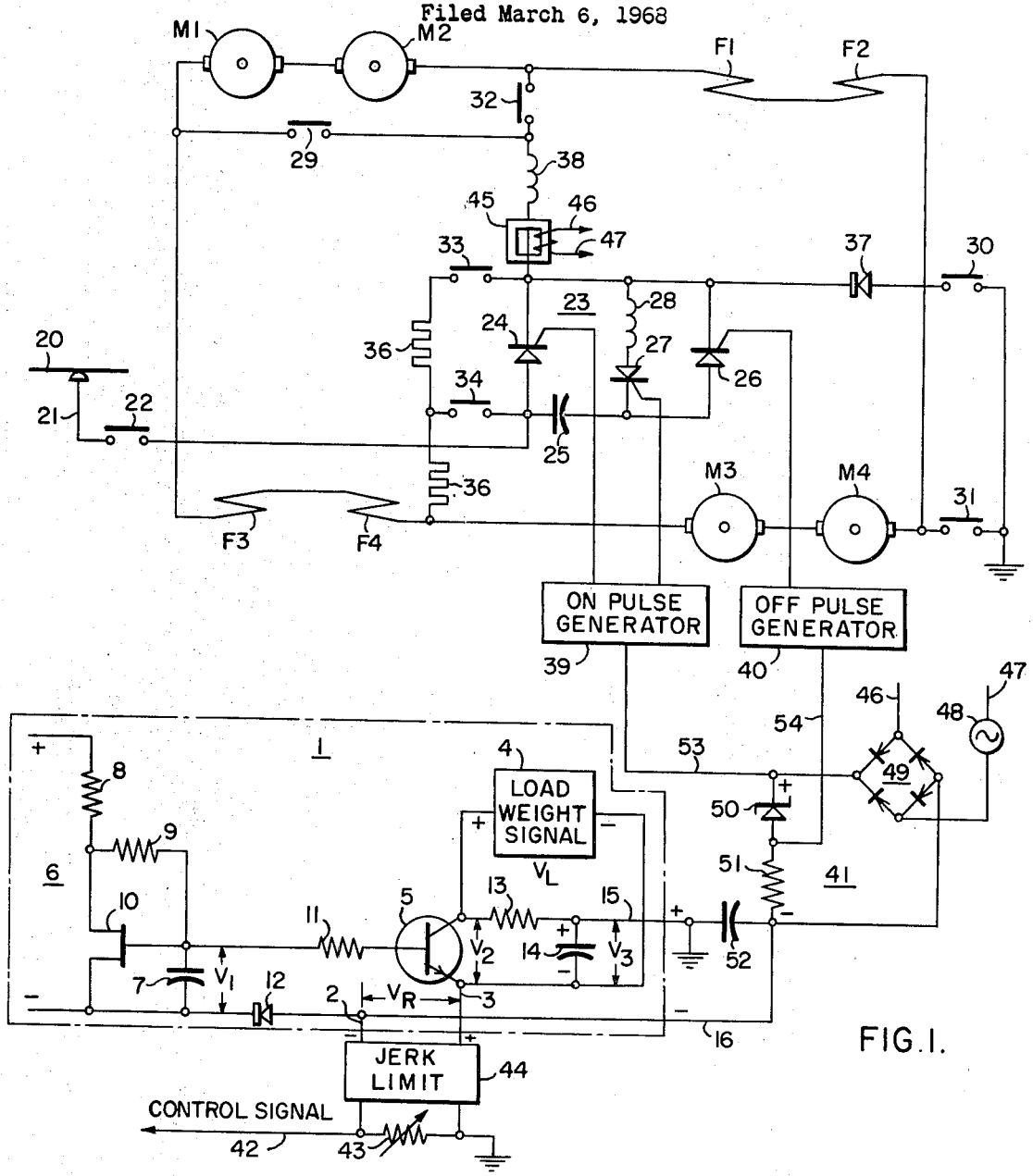

The present invention relates to control systems for traction motors, and more particularly to a circuit for adjusting the tractive effort or braking effort to the weight of the car to maintain a desired rate of acceleration or deceleration.

The circuit of the present invention is primarily intended for use in control systems for the propulsion motors of rapid transit cars. Direct current series motors are commonly used for propelling rapid transit cars and they are controlled by varying the voltage or current to control the speed or acceleration. The rate of acceleration of a car, however, is affected by the car weight, a greater tractive effort being needed to accelerate a fully loaded car than an empty car. The rate of acceleration is proportional to the applied tractive effort per ton of car weight, and since the weight will vary from time to time during operation of the car, the tractive effort must be adjusted accordingly to maintain a given rate of acceleration. The braking rate when the motors are connected for dynamic braking is similarly affected by the weight of the car, and the braking effort must also be adjusted in accordance with the weight to obtain a desired rate of deceleration. This adjustment of the tractive effort or braking effort is usually referred to as load weighing.

Heretofore, traction motors have usually been controlled by means of resistors in the motor circuit which were cut out in steps by switches or contactors to change the voltage applied to the motors. The rate of acceleration was controlled by means of a limit relay responsive to the motor current which controlled the progressive operation of the contactors and thus determined the rate of acceleration. The rate of deceleration in dynamic braking was similarly controlled by cutting out a resistor in steps under the control of the limit relay. Systems of this type usually provide only a single rate of acceleration and of braking, and the load weighing function was readily accomplished by providing a fixed signal corresponding to the desired rate of acceleration for an unloaded car and adding to it a signal proportional to the car weight. This combined signal was then used to control the motor voltage or current by adjusting the setting of the limit relay, or in some equivalent manner.

New types of control systems are now coming into use, however, utilizing semiconductor devices such as direct current choppers or phase controlled rectifiers for controlling the motor current. These systems are completely static and offer many advantages, such as reduced maintenance with increased reliability and infinitely variable rates of acceleration and of dynamic braking. Systems of these types operate in response to a control signal which represents the motor current necessary to obtain the desired tractive effort or braking effort, and thus are well adapted for use with automatic train control systems.

Control systems of these types have made possible full control of tractive effort and braking effort which is an important advantage with automatic train control. The use of the type of load weighing scheme referred to above with these systems, however, would seriously impair the effectiveness of control. A load weighing scheme which includes a fixed component of the load weight control signal is satisfactory only where the overall control system provides only one accelerating rate. Where the system provides for infinitely variable rates of acceleration or deceleration, however, it is apparent that a load weighing signal including a fixed component would prevent reduction of the tractive effort below the amount corresponding to the fixed component even though the control was calling for a lower tractive effort. For example, in the conventional prior systems, the fixed component of the load weight signal, corresponding to the tractive effort required to accelerate an empty car, could be as much as 20% of the total signal required for a fully loaded car. If the incoming control signal were then reduced to zero, the signal to the control system would still be calling for about 15% of the maximum tractive effort instead of the desired zero tractive effort, and the effectiveness of the control would thus be seriously impaired.

The present invention has as its principal object to provide a load weight circuit for traction motor control systems which will not impair full control of tractive effort and braking effort. In accordance with the invention, the load weight circuit provides a bias voltage proportional both to the car weight and to an incoming control signal. This bias voltage is then added to the control signal to provide a modified control signal for the system which has the desired characteristics, since it varies with both the car weight and the incoming control signal and has no fixed lower value, so that it cal be reduced to zero if the control signal goes to zero, thus permitting full control of tractive effort and braking effort. Briefly, the preferred embodiment of the new load weight circuit utilizes a semiconductor switch such as a transistor with a voltage proportional to the car weight applied across the transistor. The transistor is turned on and off repetitively at a rate determined by the incoming control signal so that the average voltage across the transistor is proportional to both the car weight and the control signal. This results in a suitable load weight bias voltage which is added to the control signal to provide an output voltage signal which is applied to the traction motor control system to control the motor current.

Figure 2:
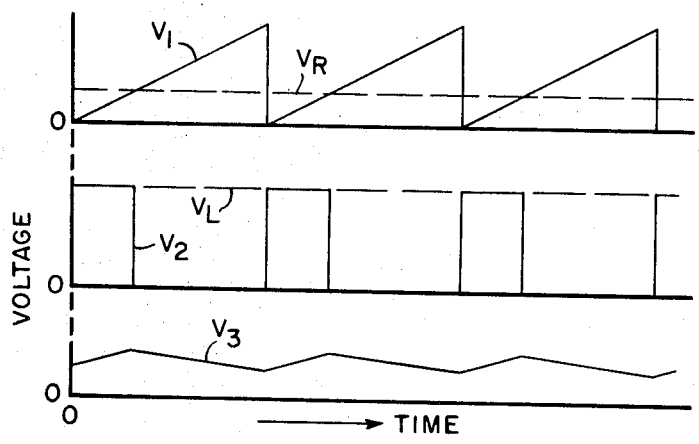

The invention will be fully understood from the following detailed description, taken in connection with the accompanying drawings, in which:

FIG. 1 is a schematic diagram showing a preferred embodiment of the invention as applied to a traction motor control system; and FIG. 2 is a set of curves showing certain voltages occurring in the circuit of FIG. 1.

There is shown in FIG. 1 a load weight circuit 1 embodying the invention. As indicated above, the purpose of this circuit is to modify an incoming control signal by adding to it a bias which represents the adjustment for weight of the car necessary to obtain the acceleration or deceleration called for by the incoming control signal, and to provide a modified control signal for the motor control system.

In the circuit shown in FIG. 1, the incoming control signal to the circuit 1 is in the form of a voltage $V_R$ between conductors 2 and 3 which varies in magnitude to represent the desired tractive effort or braking effort to be supplied by the traction motors. A load weight signal representing the weight of the car is obtained from any suitable load weighing device indicated at 4 carried on the car. Such load weighing devices are well known in the art and provide an output voltage proportional to the weight of the car. The load weight signal voltage $V_L$ thus obtained is applied across a transistor 5 as shown, the positive side of the load weight voltage being applied to the collector of the transistor and the negative side to the emitter.

The transistor 5 is operated as a switching device and, although a transistor is shown, any suitable type of semiconductor switching device might be used. The transistor 5 is turned on and off by means of a ramp voltage circuit 6 which may be of any suitable type. In the illustrative embodiment, the circuit 6 includes a capacitor 7 connected across a direct current source through resistors 8 and 9. A unijunction transistor 10 is also connected across the voltage source through the resistor 8, and its gate electrode is connected to the capacitor 7, as shown, so that when the transistor 10 is fired the capacitor is short circuited and discharges through the transistor and resistor 9. The direct current souce is preferably a regulated constant voltage source to provide a constant changing current to the capacitor 7. If desired, however, any other type of circuit might be used which would supply a constant charging current to the capacitor. It will be seen that in operation, the capacitor 7 will charge at a constant rate until its voltage becomes high enough to fire the unijunction transistor 10 which will discharge the capacitor and its voltage will then again increase at a constant rate. A repetitive ramp voltage $V_1$ thus appears across the capacitor 7 as illustrated in FIG. 2.

The ramp voltage $V_1$ is applied to the base of transistor 5 in opposition to the control signal voltage $V_R$ to turn the transistor 5 on and off repetitively. As shown, the positive side of the capacitor 7 is connected to the base of transistor 5 through a resistor 11, and the negative side of the capacitor is connected through a blocking diode 12 to the conductor 2 which is the negative side of the control signal voltage $V_R$. The conductor 3, which is the positive side of the control signal voltage, is connected to the emitter of the transistor. The ramp voltage $V_1$ therefore supplies base drive to the transistor 5 to turn it on whenever the ramp voltage exceeds the control signal voltage. The transistor 5 is thus turned on and off repetitively at intervals determined by the magnitude of the control voltage signal $V_R$. The voltage $V_2$ across the transistor 5 is substantially equal to the load weight signal $V_L$ when the transistor is off and is essentially zero when the transistor is on, as illustrated in FIG. 2. Since the transistor is turned on and off at intervals determined by the magnitude of the control signal voltage, as explained above, the off time of the transistor per cycle is proportional to the control signal voltage $V_R$ and the average value of the voltage $V_2$ is also proportional to $V_R$. A filter consisting of a resistor 13 and a capacitor 14 is provided to smooth this average voltage, and a voltage $V_3$ is thus obtained which is proportional both to the load weight voltage and to the incoming control signal voltage.

This voltage $V_3$ s added as a bias voltage to the incoming control signal voltage $V_R$. Thus, the positive side of the voltage $V_3$ is connected to an output lead 15 while the negative side is connected to the positive lead 3 of the control signal voltage. The negative lead 2 of the control signal voltage is connected to an output lead 16. The voltage appearing across the leads 15 and 16, therefore, is the sum of the voltages $V_R$ and $V_3$ and is thus equal to the incoming control signal voltage plus a load weighing bias voltage proportional both to the control signal voltage and to the car weight. This output voltage can then be used as a control signal to the motor control circuit to cause the motors to provide the desired tractive effort or braking effort adjusted in accordance with the car weight to obtain the acceleration rate or deceleration rate called for by the incoming control signal.

As privously indicated, the load weight circuit 1 is suitable for use in any traction motor control system in which the operation of the motors is controlled by a control signal. For the purpose of illustration, the circuit 1 is shown in FIG. 1 embodied in a complete traction motor control system utilizing a direct current chopper to control the motor current.

FIG. 1 is a very much simplified schematic diagram showing a traction motor control system of the type disclosed in a copending application of J. M. Mills, Ser. No. 711,109, filed Mar. 6, 1968, and assigned to the assignee of the present application. As shown, there are two series-connected motors M1 and M2 having field windings F1 and F2, respectively, connected in series with the motors. A second pair of motors M3 and M4 are also connected in series with their field windings F3 and F4, respectively, the two pairs of series-connected motors being connected in parallel for power operation. Two pairs of motors in parallel are shown, in accordance with usual practice for the propulsion motors of rapid transit cars, but it will be understood that the system is applicable to a single motor or to any number of motors connected in any desired manner. Power is supplied to the motors from a third rail or trolley 20 through a current collector 21 and line switch 22.

The motor current is controlled by a direct current chopper 23 of any suitable type. The preferred type of chopper shown includes a thyristor 24 adapted to carry the total motor current, with a commutating capacitor 25 and a turn-off thyristor 26 connected across the thyristor 24 in the manner shown. An oppositely poled thyristor 27 and a reactor 28 are connected in a loop circuit with the capacitor 25 as shown. The chopper is started in operation by initially firing the thyristor 26 to permit the capacitor 25 to charge from the line, the thyristor 26 turning off when the charging current goes to zero. The chopper is then turned on by simultaneously firing thyristors 24 and 27. This permits current flow through thyristor 24 to the motors and at the same time completes an oscillatory circuit through the reactor 28 and thyristor 27 to capacitor 25. Current flows in this circuit from capacitor 25 to reactor 28 and back to the capacitor, thus charging the capacitor with its voltage reversed after which thyristor 27 turns off. The chopper is then in its on condition with thyristor 24 carrying the motor current. The chopper 23 is turned off by firing thyristor 26 which applies the reverse voltage of capacitor 25 across thyristor 24 to turn it off, the capacitor then again charging from the line through thyristor 26 which turns off when the charging current goes to zero. It will be understood that these operations of turning the chopper on and off take place very rapidly, in a few microseconds, and the chopper can be turned on and off repetitively at a very rapid rate.

The motor circuit also includes a set of power contacts 29, 30 and 31 and a set of braking contacts 32, 33 and 34. A braking resistor is also provided consisting of a relatively small resistor 35 and a relatively larger resistor 36 connected in series. A free-wheeling diode 37 is connected as shown and a reactor 38 is preferably connected in series with the motors to smooth the motor current.

For power operation, the power contacts 29, 30 and 31 and the line switch 22 are closed and it will be seen that current flows from the third rail 20 through the line switch 22, the chopper 23 and the contact 29 to the two pairs of motors in parallel and then to ground through contact 31. The motor current is controlled by turning the chopper 23 on and off as required to maintain the desired average current, as more fully explained in the above mentioned Mills application. When the chopper is turned on, the motor current builds up to a desired maximum and the chopper is then turned off. The current in the highly inductive motor circuit decays to a desired minimum, flowing through the contact 30 and the free-wheeling diode 37, and the chopper is then again turned on. In this way, the desired average motor current is maintained. For dynamic braking, the braking contacts 32, 33 and 34 are closed, the power contacts and line siwtch being open. In this connection, it will be seen that the motors are connected in a conventional braking circuit consisting of two loop circuits with a common branch containing the braking resistors 35 and 36 and with the chopper 23 connected across the resistor 36. The braking current is then controlled by turning the chopper on and off to cut the resistor 36 in and out of the circuit to maintain a desired average current corresponding to a desired braking effort.

The chopper 23 is turned on and off by means of gate pulses derived from an On pulse generator 39 which supplies gate pulses to thyristors 24 and 27, and an Off pulse generator 40 which supplies gate pulses to thyristor 26. Triggering signals for actuating the pulse generators are provided by a control circuit 41 which, in effect, compares the actual motor current with a control signal representing the desired motor current and signals the pulse generators to turn the chopper on or off as required.

The complete motor control system is controlled by a control signal applied through the conductor 42. The control signal is preferably in the form of a signal current which may be obtained from an automatic train control system of any suitable type, or from any other desired type of controller, and the magnitude of the control signal current represents the desired motor current for the necessary tractive effort or braking effort to obtain the desired rate of acceleration deceleration of the car. A control signal voltage is derived from the signal on conductor 42 and is shown diagrammatically as the voltage across a resistor 43 which is indicated as being variable to represent the varying control voltage.

It will be understood that a control system of the type shown is capable of very rapid operation and can follow changes in the control signal almost instantaneously. If the control signal voltage appearing on resistor 43 were applied directly to the control of the motors, therefore, the car would be subjected to extremely rapid changes in acceleration or deceleration, which is not acceptable in a rapid transit control system because of the discomfort and even danger to the passengers. The control signal voltage therefore is preferably modified by a jerk limit circuit 44 which responds to the incoming control signal at 43 and provides a modified control signal which follows the incoming control signal but with a slower rate of change so that the rate of change of acceleration or deceleration of the motors is limited to an acceptable value. Circuits for this purpose are known but a preferred type of circuit for use in this system is disclosed in a copending application of L. G. Miller, Ser. No. 711,103, filed Mar. 6, 1968, and assigned to the assignee of the present application.

The modified control signal voltage obtained from the jerk limit circuit 44 is applied to the load weight circuit 1 on conductors 2 and 3. The circuit 1 operates in the manner described above to provide an output signal voltage across conductors 15 nd 16 which represents the desired motor current but which is modified by the circuits 44 and 1 to have a limited maximum rate of change and to contain the necessary adjustment corresponding to the car weight to obtain the desired tractive effort or braking effort.

The control signal voltage across conductors 15 and 16 is applied to the control circuit 41 to be compared with the actual motor current. A voltage proportional to the motor current is obtained from a transductor 45 connected in the motor circuit to carry the total motor current in either the power or braking connection. The transductor 45 may be of any suitable type and the leads 46 and 47 of its alternating current winding are connected to a suitable source 48 of alternating current which may be derived from the car battery through an inverter, or which may be any other suitable source. The output current of the transductor is rectified by a rectifier bridge 49. The direct current output of the rectifier 49 therefore provides a voltage which is proportional to the motor current and which is applied to the control circuit 41.

The control circuit 41 includes three impedance means connected in series. In the illustrative embodiment these consist of a Zener diode 50, a resistor 51 and a capacitor 52. The voltage obtained from the rectifier 49 is applied across the Zener diode 50 and resistor 51 in series, as shown, and the control signal voltage from the load weight circuit 1 is applied across the capacitor 52, the polarities of these two voltages being opposing as indicated on the drawing. A conductor 53 is connected to the upper end of the diode 50 to provide a triggering signal to the On pulse generator 39 and a conductor 54 is connected to the junction between the diode 50 and resistor 51 to provide a triggering signal to the Off pulse generator 40.

If the signal voltage across the diode 50 and the resistor 51 is greater than the control voltage across the capacitor 52, there is a positive resultant voltage at conductor 53. If the motor current decreases so that the voltage across diode 50 and resistor 51 becomes less than the voltage across capacitor 52, the voltage on conductor 53 will go negative and this triggers the On generator 39 to turn on the chopper 23 so that the motor current can increase. When the motor current has increased by an amount corresponding to the voltage across the diode 50, the voltage on conductor 54 will become positive and this triggers the Off pulse generator 40 to turn the chopper 23 off. The pulse generators may be of any desired type which will operate in the manner described, but they are preferably of the type disclosed in the abovementioned Mills application to which reference is made for a detailed description of the operation of the pulse generators.

The chopper 23 is turned on and off in this way as required to maintain the desired average motor current. The voltage drop across the diode 50 represents the difference between the valves of motor current at which the chopper is turned on and turned off and thus determines the amount of ripple in the motor current. It will be seen that in this way the motors are controlled in accordance with the incoming control signal at 42 to maintain the desired rate of acceleration or deceleration called for by the control signal.

The load weight circuit 1 is applied to this control system in the manner described to adjust the tractive effort or braking effort developed by the motors to the car weight. This circuit has many advantages when applied to control systems of the type shown, or to other types which respond to a control signal to control the motor current. The load weight circuit 1 permits the full control of tractive effort or braking effort possible with control systems of this type, since it allows variation of the tractive effort and control of acceleration and braking rates over the full range extending down to zero. This is an important advantage as compared to previously known load weight circuits which provided an output signal containing a fixed component and thus did not permit control of the tractive effort over the full range.

The new circuit also has another important advantage. The previously used types of load weight circuits were effective only up to a limited maximum load, which was satisfactory for use with control systems providing only a single accelerating rate since the maximum permissible motor current limited the operation of the system. The load weighing signal could therefore be clipped for loads above the limit corresponding to the maximum permissible motor current in order to protect the motors. With control systems permitting variable rates of acceleration or braking, such an arrangement would have undesirable limitations. For example, it would be desirable at reduced acceleration rates to permit the system to function to higher load weights than at full or maximum acceleration rate. The circuit of the present invention permits this since the control signal obtained from the load weight circuit is proportional to the incoming control signal and thus to the acceleration rate called for as well as to the load. This therefore gives an output signal proportional to total weight and if a maximum limit on total motor current is included in the control system, the operation is then limited only by motor current and not by the load weight, which is the desired type of operation.

It will be seen therefore that the new load weight circuit has many advantages in addition to the advantage of being a completely static circuit of relatively small size and high reliability. An illustrative embodiment of the invention has been shown and described for the purpose of illustration, but it will be apparent that various modifications and other embodiments are possible within the scope of the invention, and it is not limited to the specific arrangement or circuit details shown but includes all equivalent embodiments and modifications.

I claim as my invention:

1. In a control system for traction motors for propelling a car, said system including switching means for controlling the motor current and means for actuating the switching means in response to a control signal, means for providing a control signal voltage from an incoming control signal, means for providing a voltage proportional to the weight of the car, means for deriving a voltage proportional to both of said voltages, and means for adding said last-mentioned voltage and said control signal voltage to provide a modified control signal for said control system.

2. The combination defined in claim 1 which includes a semiconductor switching device, means for applying the voltage proportional to car weight across said switching device, means for turning the switching device on an off at intervals determined by the magnitude of said control signal voltage to provide an average voltage across the switching device proportional to both the voltage proportional to car weight and the control signal voltage, and means for adding said average voltage to the control signal voltage to provide a modified control signal for said control system.

3. A load weight circuit for use in a control system for traction motors propelling a car, said circuit including means for providing a control signal voltage from an incoming control signal, means for providing a voltage proportional to the weight of the car, means for deriving a bias voltage proportional to both of said first-mentioned voltages, and means for adding said bias voltage to said control signal voltage to provide a modified output signal voltage for application as a control signal to said control system.

4. A circuit as defined in claim 3 in which the means for deriving a bias voltage comprises a semiconductor switching device, means for applying the voltage proportional to car weight across said switching device, and means for turning the switching device on and off at intervals determined by the magnitude of the control signal voltage to provide an average voltage across the switching device proportional to both of said first-mentioned voltages.

5. A circuit as defined in claim 4 which includes filtering means for smoothing the voltage across the switching device.

6. A circuit as defined in claim 3 in which the means for deriving a bias voltage comprises a transistor, means for applying said voltage proportional to car weight across the emitter and collector of the transistor, and means for repetitively applying base drive to the transistor to turn it on and off at intervals determined by the magnitude of said control signal voltage to provide an average voltage across the transistor proportional to both of said first-mentioned voltages.

7. A circuit as defined in claim 3 in which the means for deriving a bias voltage comprises a transistor, means for applying said voltage proportional to car weight across the emitter and collector of the transistor, means for providing a repetitive ramp voltage, and means for applying said ramp voltage and said control signal voltage in opposition to the base of the transistor to supply base drive to the transistor whenever the ramp voltage exceeds the control signal voltage, whereby the transistor is turned on and off repetitively at intervals determined by the magnitude of the control signal voltage to provide an average voltage across the transistor proportional to both the control signal voltage and the voltage proportional to car weight.

8. A circuit as defined in claim 7 including means for connecting the bias voltage across the transistor additively in series with the control signal voltage to provide a modified output signal voltage.

References Cited

UNITED STATES PATENTS

| | | | |
|---|---|---|---|
| 3,147,422 | 9/1964 | Thomas | 318—416 |
| 3,218,537 | 11/1965 | Stamm | 318—395 |
| 3,378,746 | 4/1968 | Weiser | 318—395 |
| 2,301,689 | 11/1942 | Edwards | 318—143 |
| 2,674,348 | 4/1954 | Santini | 318—143 |

ORIS L. RADER, Primary Examiner

K. L. CROSSON, Assistant Examiner

U.S. Cl. X.R.

318—158, 392, 416